J. R. ROGERS 1,561,114

TYPOGRAPHICAL MACHINE

Filed March 20, 1924     9 Sheets-Sheet 4

INVENTOR
John R. Rogers
BY
Rogers, Kennedy Campbell
ATTORNEYS

Nov. 10, 1925.

J. R. ROGERS

TYPOGRAPHICAL MACHINE

Filed March 20, 1924    9 Sheets-Sheet 5

INVENTOR
John R. Rogers
BY
Rogers, Kennedy & Campbell
ATTORNEYS

Nov. 10, 1925.  1,561,114
J. R. ROGERS
TYPOGRAPHICAL MACHINE
Filed March 20, 1924  9 Sheets-Sheet 8

INVENTOR
John R. Rogers
Rogers, Kennedy & Campbell
ATTORNEYS

Nov. 10, 1925.

J. R. ROGERS 1,561,114

TYPOGRAPHICAL MACHINE

Filed March 20, 1924   9 Sheets-Sheet 9

INVENTOR
John R. Rogers
BY
Rogers, Kennedy & McCauliff
ATTORNEYS

Patented Nov. 10, 1925.

1,561,114

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

TYPOGRAPHICAL MACHINE.

Application filed March 20, 1924. Serial No. 700,467.

*To all whom it may concern:*

Be it known that I, JOHN R. ROGERS, a citizen of the United States, residing at Brooklyn, in the county of Kings and State of New York, have invented certain new and useful Improvements in Typographical Machines, of which the following is a specification.

This invention relates to typographical machines, such as linotype machines of the general organization represented in U. S. Letters Patent to O. Mergenthaler, No. 436,532, wherein circulating matrices are released from a magazine in the order in which their characters are to appear in print and then assembled in line, the composed line transferred to the face of a mold, the mold filled with molten metal to form a slug or linotype against the matrices which produce the line of type characters thereon, and the matrices thereafter returned by a distributing mechanism to the magazine from which they started. As the slugs are successively cast, they are ejected from the mold and delivered into a receiving galley at the front of the machine.

The standard machines now in general use are constructed and designed for the production of slugs not exceeding 30 ems in length. Hence, for certain classes of work, e. g., in the case of catalogues, periodicals, magazines, etc., which employ type lines of much greater length, it is necessary to cast different parts of the individual type lines on separate slugs and use the latter end to end in abutting relation. Such slugs are ordinarily cast of equal length and, consequently, when assembled in the printing form, the joints between the abutting slugs in the successive type lines coincide with each other and produce an objectionable line or streak in the printed matter. To meet this objection, it has been proposed to produce the separate slugs of unequal length and assemble them in the printing form in such manner that the joint between the slugs in the successive type lines will be displaced or offset with relation to each other. Such proposal has been made in connection with machines equipped with a slug saw or cutter which is arranged to sever the blank portions from individual slugs as they are ejected from the mold and which can be changed in position by hand to produce the final slugs of any length desired within the 30 em limitation before mentioned. However, the production of slugs of unequal length and in the required order to give effect to the above proposal, not only requires a great deal of care and attention on the part of the operator because of the many factors involved, but in addition entails a considerable loss of time in the operation of the machine, and hence it is more common practice merely to produce the slugs of equal length and match them end to end in the objectionable manner first mentioned.

The present invention is designed to adapt the standard linotype machine to carry out the foregoing plan or proposal entirely automatically and without requiring any attention on the part of the operator, except for the initial setting of the machine. In other words, the invention is directed to certain improvements which will adapt the machine automatically to produce the separate slugs of unequal length and in such order or sequence as to avoid the aforesaid objectionable line or streak in the printed matter. To this end, specifically, the machine is equipped with mechanism whereby the customary slug saw or cutter is automatically adjusted back and forth between two different operative positions at every other slug casting and severing operation so as to produce the slugs in alternate pairs, first two of one length and then two of another length, and so on throughout the series. The manner in which this result is accomplished will best be understood from the detailed description to follow.

In the accompanying drawings:

Fig. 7ᵃ is a detail view of the clutch by which the automatic saw adjusting mechanism may be rendered active or inactive at will;

Figure 1:
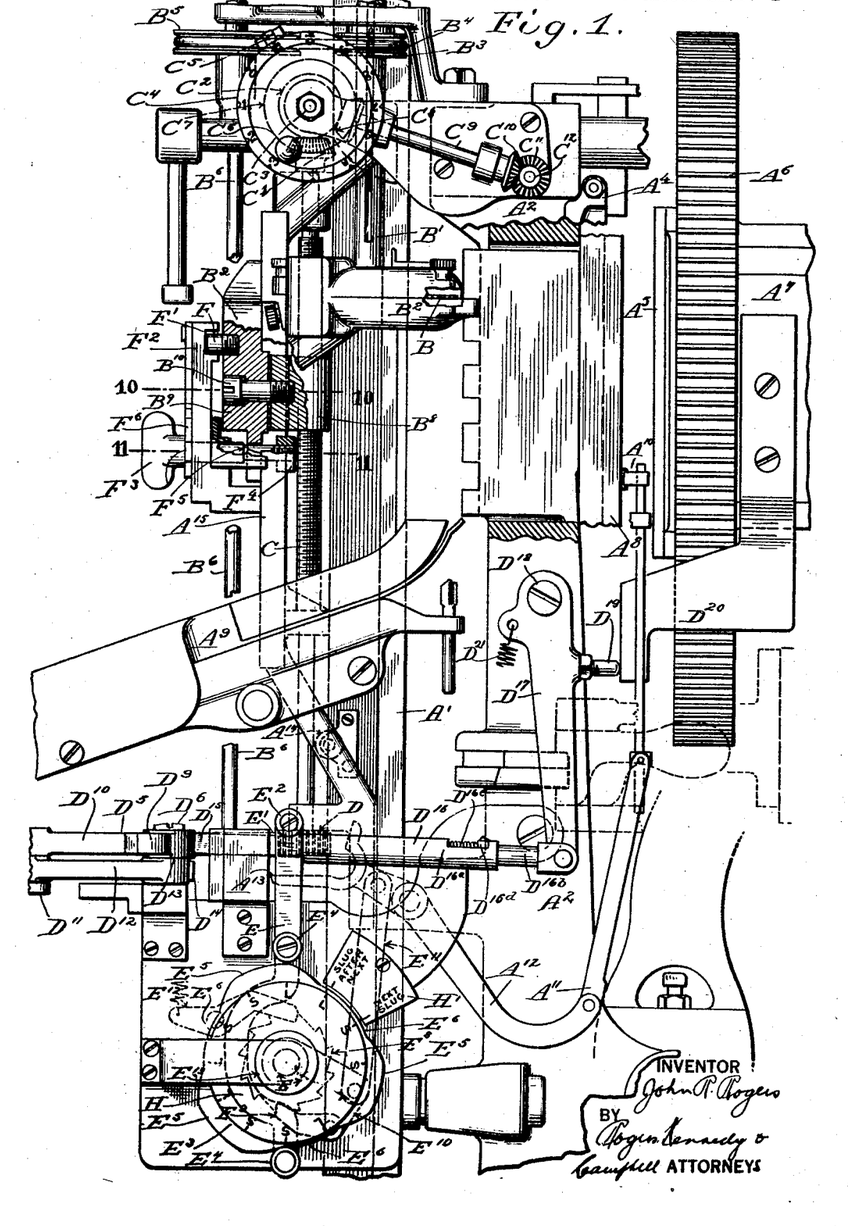
Fig. 1 is a side elevation, partly in section, of a portion of a linotype machine having the invention applied thereto.
Figure 2:
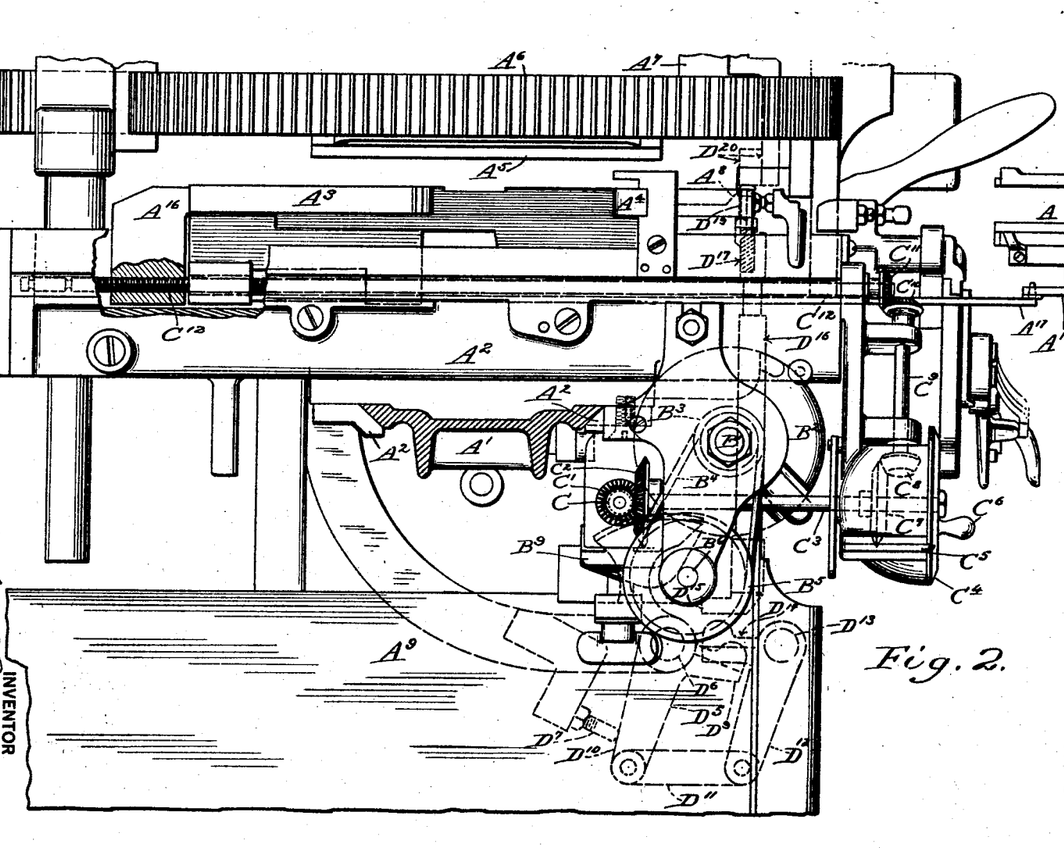
Fig. 2 is a plan view thereof.
Figure 3:
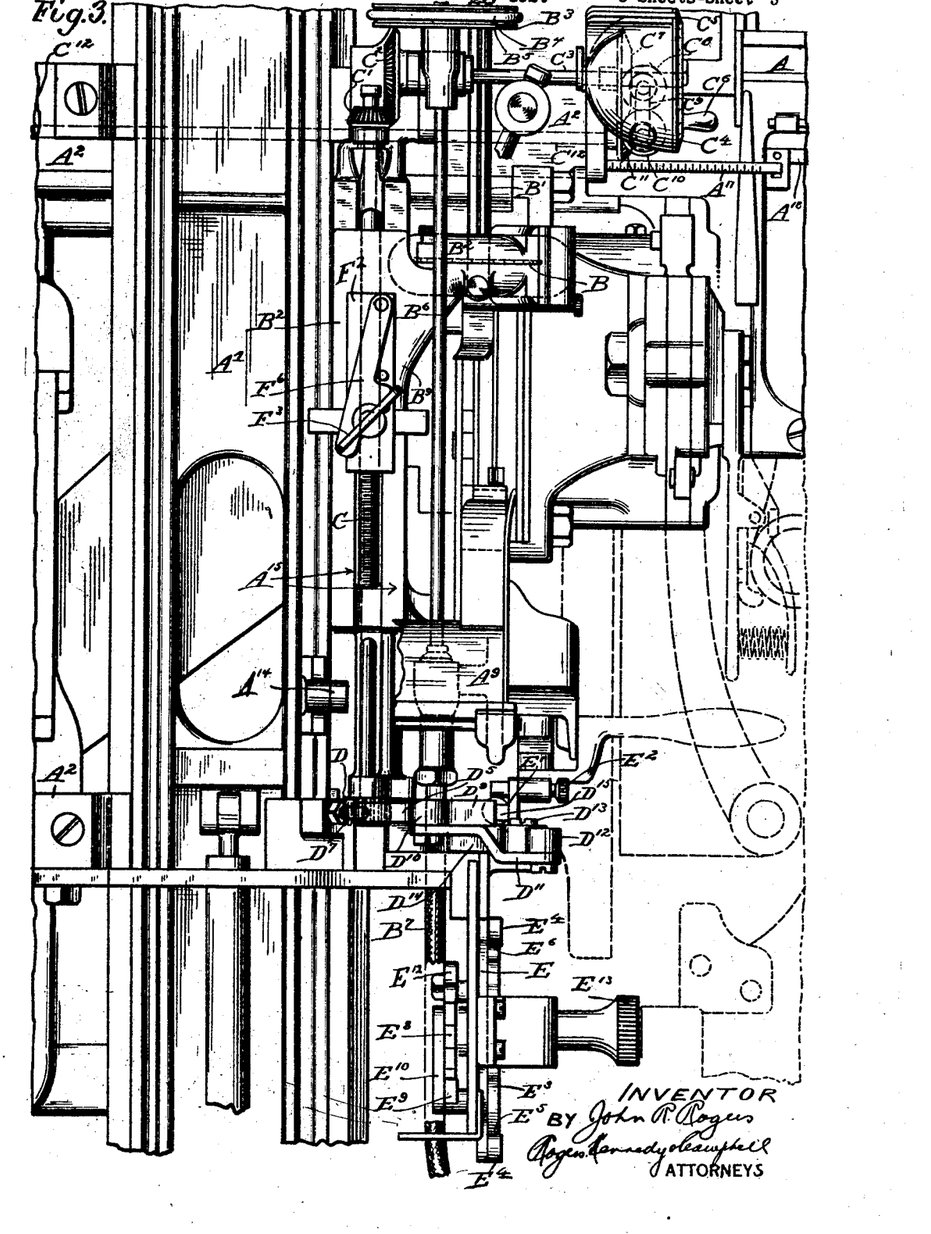
Fig. 3 is a front elevation.
Figure 14:
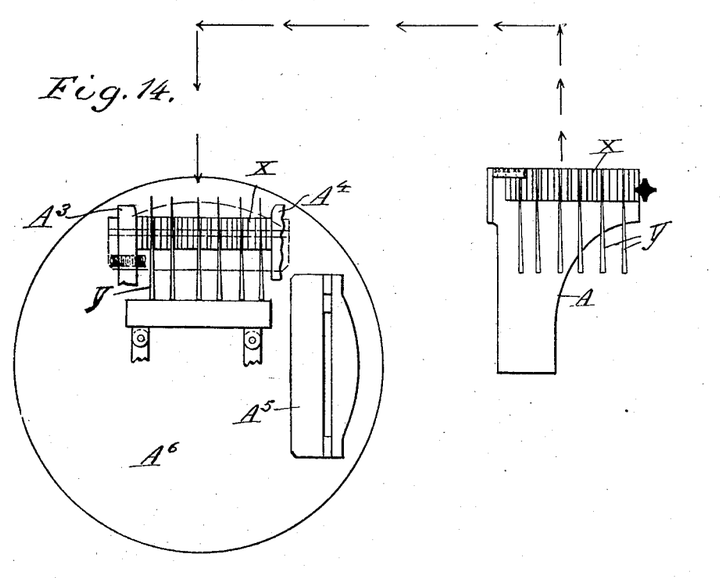
Figs. 14 and 15 are diagrammatic views showing the matrix lines for the long and short slugs as they appear before and after justification.
Figure 15:
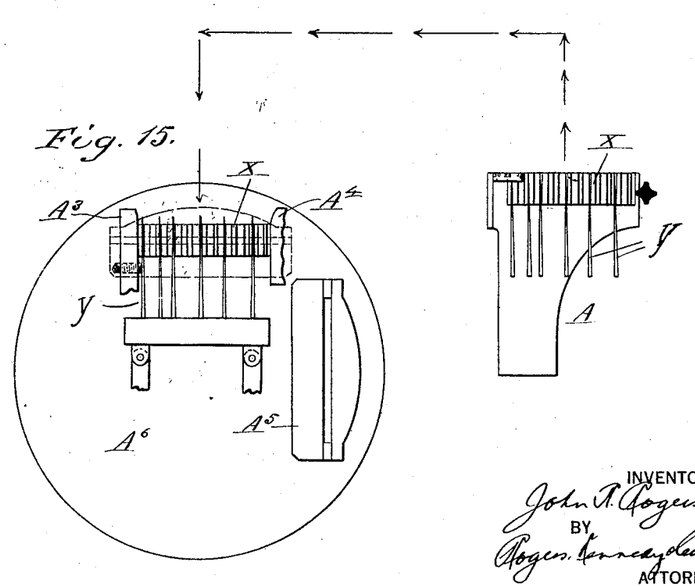

The matrices X and spacers Y are composed in line in the usual way in the assembler elevator A, shown diagrammatically in Figs. 14 and 15 and partly in full lines in Figs. 2 and 3. After composition, the line is transferred into the so-called first elevator $A^1$, mounted to reciprocate vertically in suitable guideways of the vise frame $A^2$. Upon receipt of the line, the first elevator descends and locates it between the two vise jaws $A^3$ and $A^4$, where the line is justified preparatory to the casting operation. After the line has entered the two vise jaws, the mold $A^5$ is advanced into contact with the line and molten metal injected into the mold for the slug casting operation. The mold $A^5$ is carried by the disk $A^6$ which is rotatably mounted on the reciprocating mold slide $A^7$ so as to locate the mold first in a horizontal position for the casting of the slug, as just mentioned, and then in a vertical position, as shown in Fig. 1, for the ejection of the cast slug. The ejection of the cast slug is effected by means of an ejector blade (not shown) which advances from the rear and pushes the slug before it through the pair of trimming knives $A^8$ and into the galley $A^9$. Associated with the trimming knives is the wiper $A^{10}$, arranged to move upwardly and downwardly along the edges of the knives and free them from any waste metal which may adhere thereto after the trimming of the slug. This knife wiper is connected by the link $A^{11}$ to the operating lever $A^{12}$ which is provided with the fork $A^{13}$ arranged to be engaged by the roll $A^{14}$ carried by the first elevator $A^1$, the latter serving to move the wiper upwardly and downwardly as it descends and ascends, respectively. The foregoing parts and their mode of operation are or may be the same as embodied in the commercial linotype machine and are so well known that any further description would be superfluous. However, it may be noted that all of the parts are so coordinated as to perform their respective functions at each cycle of operation of the machine, it being understood that a slug is cast and delivered at each such cycle.

Figure 18:
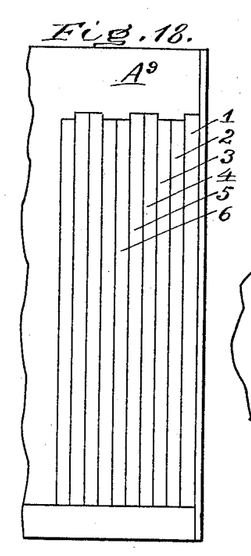
Fig. 18 is a view showing a number of long and short slugs assembled in the receiving galley in the order of their production.
Figure 19:
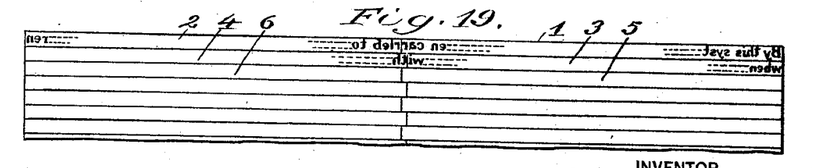
Fig. 19 is a view of a portion of a printing form made up of composite lines as produced in accordance with the invention, and showing how the lines of junction between the slugs of the individual composite lines break joint with each other.

As before stated, the present invention is intended to produce slugs of unequal length and in a certain definite sequence. Thus, as shown in Figs. 18 and 19, each individual type line is made up of two slugs, one short and one long, the slugs being produced successively in the order indicated by the numerals 1, 2, 3, 4, 5, 6, etc. It will be apparent at once that, after the production of the first slug, which in this instance is a long one, the following slugs are produced in alternate pairs, first two of the shorter length, and then two of the longer length, and so on. In this way, when the slugs are assembled end to end in the printing form in the order of their production, the joint between the abutting slugs of each printing line will stand out of alignment with the joints between the abutting slugs in the adjacent printing lines.

While, in the broader aspects of the invention, the production of the slugs in the foregoing manner might be carried out in other ways, the desired result is herein accomplished by utilizing the usual saw or cutter B with which some of the commercial machines are provided. This saw (Figs. 1, 2, 3 and 8) is fixed to the lower end of a vertical shaft B' and is enclosed (except at one side, where it is exposed to act upon the slugs as they issue from the mold) within a housing $B^2$ which affords a bearing for the lower end of the shaft and which forms in effect a saw-carrier. The shaft B' is splined at its upper end to a pulley $B^3$ connected by a band $B^4$ to a driving pulley $B^5$ fixed to the upper end of a second vertical shaft $B^6$ receiving motion from any suitable source through the medium of a flexible shaft $B^7$. The saw-carrier $B^2$ (Figs. 1 and 10) is provided with a depending block $B^9$ slidable upon guide rails $A^{15}$ and connected by a bolt $B^{10}$ to a nut $B^8$ also slidable upon said rails. This nut $B^8$ is threaded to a vertical feed screw C adapted to be rotated in opposite directions for adjusting the carrier upwardly or downwardly to set the saw in any desired position. At its upper end, the feed screw is connected through bevel gearing $C^1$, $C^2$, to a manually operated shaft $C^3$ provided at its outer end with a dial plate $C^4$ graduated in "points" and adapted to be read in connection with a fixed pointer $C^5$. As shown, the dial plate is provided with a crank or handle $C^6$ for facilitating the operation of the shaft $C^3$ and the consequent rotation of the feed screw C. The shaft $C^3$ is also connected through bevel gearing $C^7$, $C^8$, to a cross shaft $C^9$, which in turn is connected through bevel gearing $C^{10}$, $C^{11}$, to a long shaft $C^{12}$ having a threaded connection with a follower block $A^{16}$ engaging the left-hand vise jaw $A^3$. The follower block has connected to it a sliding rod $A^{17}$ extending to the right of the vise frame to make connection with a slide $A^{18}$ carrying the so-called assembler stop which determines the length of the composed line. The rod $A^{17}$ is graduated in "ems" to guide the operator in the setting of the parts for major adjustments. Due to these connections, when the shaft $C^3$ is operated to effect the desired adjustment of the slug severing saw it simultaneously effects a corresponding adjustment of the line clamping jaw and the assembler stop.

The parts so far described and their mode of operation are or may be the same as embodied in the commercial linotype machine and are fully set forth in the Mohr Patent No. 1,264,541, to which reference may be had.

Figure 6:
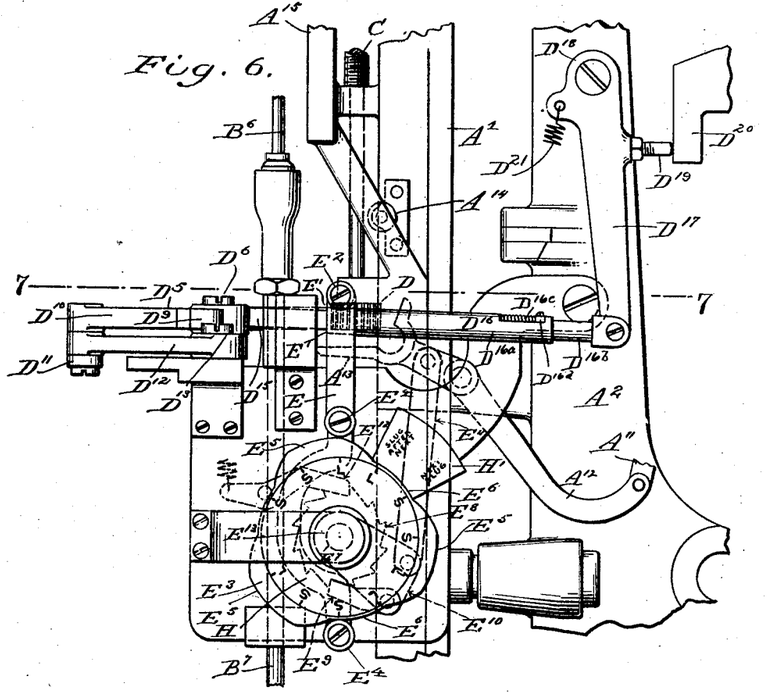
Fig. 6 is a view similar to Fig. 4 but showing the parts in a different position.
Figure 7:
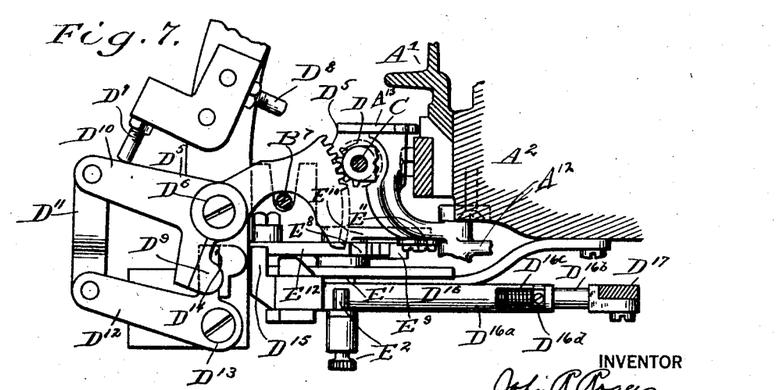
Fig. 7 is a horizontal sectional plan view taken on the line 7—7 of Fig. 6.
Figure 7A:
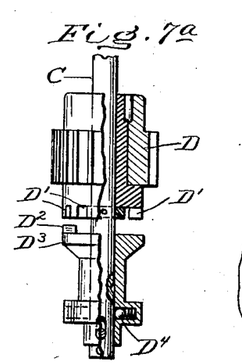
Figure 8:
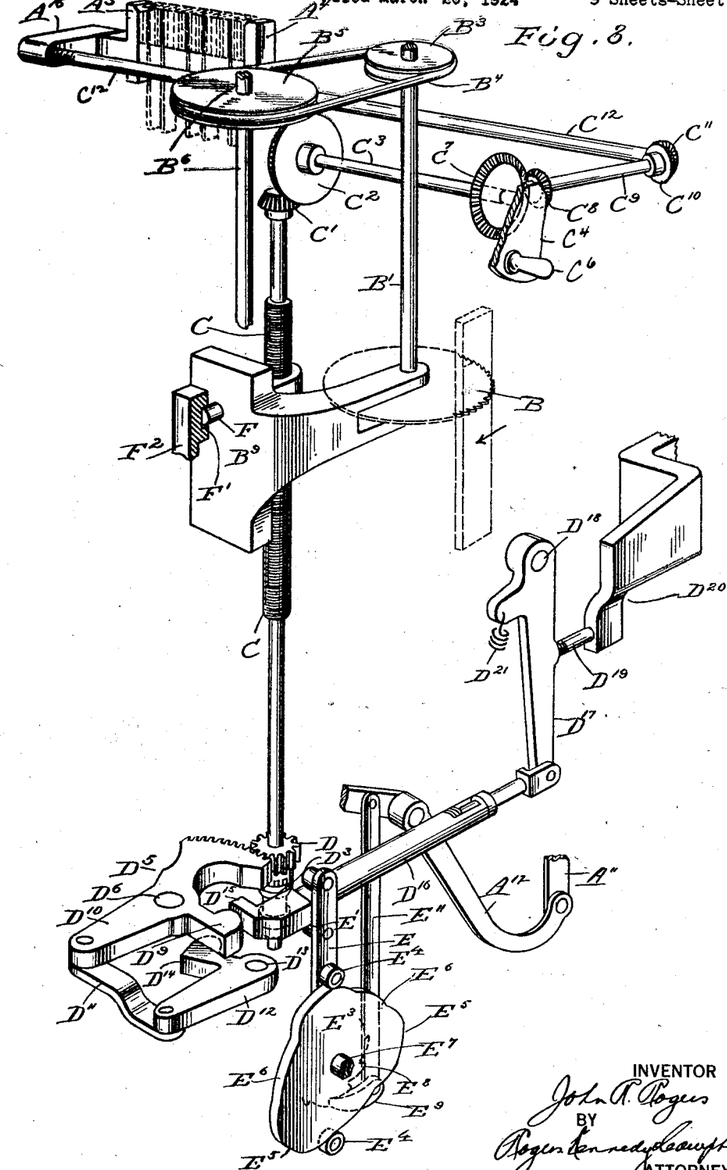
Fig. 8 is a perspective view, in the nature of a diagram, illustrating the general operation of the parts.

Coming now to the present invention, means are provided whereby the saw B, after being set as above described in whatever position is desired according to the length of the composed type lines to be produced, may be automatically adjusted from its manually set position in order to produce the alternate pairs of slugs of the different lengths required. Such means are best illustrated in Figs. 4 to 9. As shown, the feed screw C is provided at its lower end with a pinion D mounted to turn freely thereon and provided (Fig. 7a) in its under side with notches D' adapted to be engaged by a tooth $D^2$ on a clutch collar $D^3$ splined to the screw spindle and capable of a slight axial movement thereon to make or break engagement with the pinion. During the automatic operation of the feed screw, the clutch collar $D^3$ is maintained in engagement with the pinion D, as by means of a ball detent $D^4$, but at other times it is disengaged therefrom to permit the manual operation of the screw. The pinion D is engaged by a swinging segment gear $D^5$ pivoted, as at $D^6$, and limited in its swinging movements by two fixed stop pins $D^7$ and $D^8$. As will be noted, the gear $D^5$ is provided with a laterally extending arm $D^9$ and a forwardly extending arm $D^{10}$, the latter being connected by a link $D^{11}$ to an elbow lever $D^{12}$. The elbow lever $D^{12}$ is pivoted at $D^{13}$ and is disposed in a lower horizontal plane with its shorter arm $D^{14}$ located beneath the shorter arm $D^9$ of the segment gear. By reason of this construction and arrangement of the parts, when the arm $D^9$ is moved forwardly as indicated in Fig. 7, the segment gear will be rocked clockwise to rotate the feed screw C in one direction; whereas, when the arm $D^{14}$ is moved forwardly, the segment gear will be rocked counter-clockwise to rotate the feed screw in the opposite direction. The first turning movement serves to adjust the saw-carrier downwardly, while the second turning movement serves to adjust it upwardly. These two adjusting movements of the saw are effected automatically by one periodically operated part of the machine and are controlled automatically by another periodically operated part of the machine, as will now be described.

The two gear rocking arms $D^9$ and $D^{14}$ are actuated by a pusher head $D^{15}$ on the forward end of a fore and aft member or link $D^{16}$, which is pivoted at the rear to the lower end of an upright lever $D^{17}$ suspended from a pivot stud $D^{18}$. The lever $D^{17}$ is provided with a rearwardly extending pin $D^{19}$ held in engagement with a finger $D^{20}$ on the mold slide $A^7$ by means of a spring $D^{21}$. The form and relation of these parts is such that when the mold slide $A^7$ advances during each cycle of operation of the machine, the lever $D^{17}$ is swung forwardly on its axis to impart the effective stroke to the gear actuating member $D^{16}$, and when the mold slide retreats, the lever is swung rearwardly by the spring $D^{21}$ to impart the return stroke to the gear actuating member.

Figures 9, 10, 11, 12, 13:
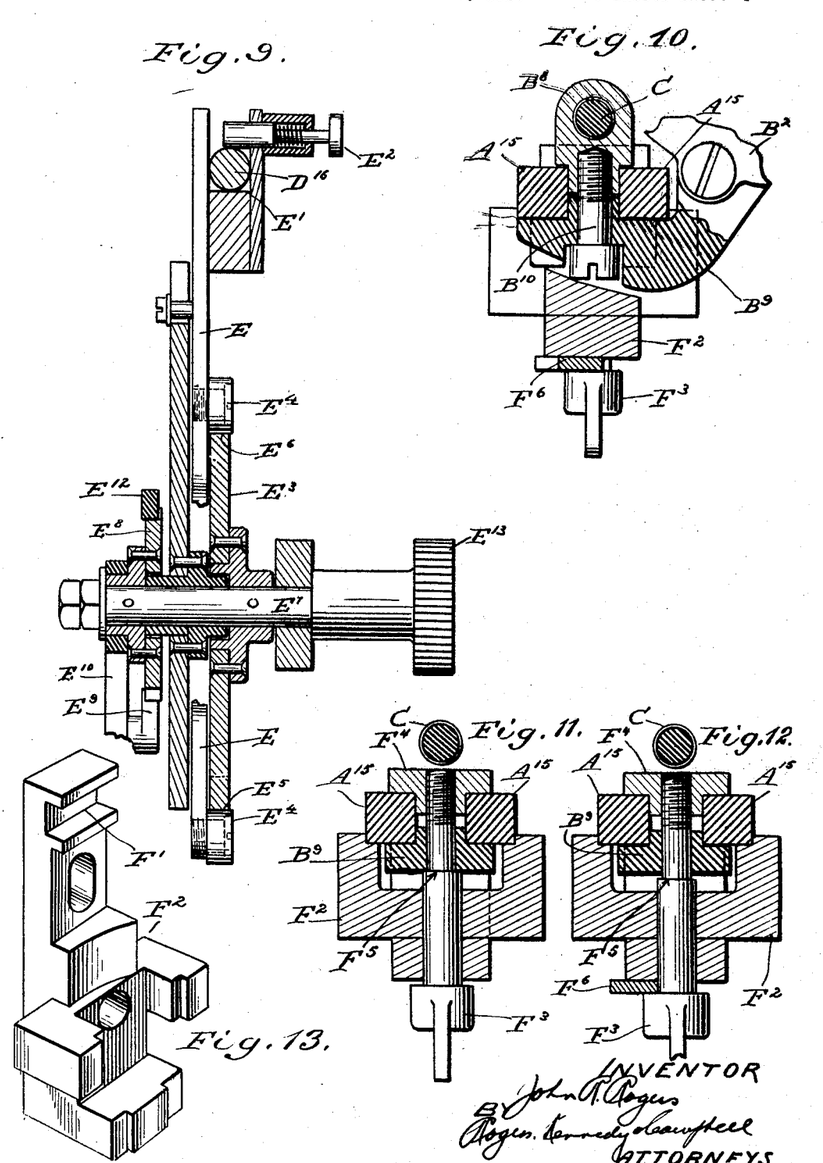
Fig. 9 is a vertical section, on an enlarged scale, taken on the line 9—9 of Fig. 4.
Fig. 10 is an enlarged horizontal section taken on the line 10—10 of Fig. 1.
Fig. 11 is a similar section taken on the line 11—11 of Fig. 1.
Fig. 12 is a view similar to Fig. 11 but showing the parts in a different position.
Fig. 13 is a perspective view of a detail.

The above actuating member $D^{16}$ is supported at its forward end by a vertically movable slide E provided at the top with a socket $E^1$ in which the actuating member is slidably arranged and wherein it is confined by a releasable locking bolt $E^2$ (Fig. 9). The slide E is raised and lowered by a rotary cam $E^3$ cooperating with upper and lower rollers $E^4$ thereon and formed with alternate high and low surfaces $E^5$ and $E^6$, respectively, there being three each of such surfaces. The cam $E^3$ is fast to a horizontal shaft $E^7$ and is rotated by means of a ratchet wheel $E^8$, also fast to said shaft and having twice as many teeth as there are cam surfaces, or twelve in all. The ratchet wheel $E^8$ is advanced step by step by means of a pawl $E^9$ pivoted to a rocker plate $E^{10}$ loosely mounted on the shaft $E^7$ and connected by a link $E^{11}$ to the forward arm of the knife wiper operating lever $A^{12}$, before alluded to. A spring-actuated detent $E^{12}$ cooperates with the ratchet wheel to prevent retrograde movement. At each operation of the machine, upon the descent of the first elevator $A^1$ to present the composed line in casting position, the lever $A^{12}$ is operated to advance the ratchet wheel $E^8$ the distance of one tooth only. Inasmuch as there are twice as many ratchet teeth as there are cam surfaces, the cam $E^3$ will allow the slide E to remain at rest in its shifted position until a second impulse is given to the ratchet wheel by a second operation of the lever $A^{12}$ by the first elevator. In this way, the actuating member $D^{16}$ is shifted only at every other casting operation, making idle strokes between the shifting periods. As a result, the slug severing saw is adjusted back and forth between its two different positions at the proper times, although maintained in each of such positions until it has acted upon two successive slugs, thus producing the final slugs in alternate pairs of different lengths, as required.

It will be understood that, due to the previously described connections between the feed screw C and the follower block $A^{16}$ and the assembler slide $A^{18}$, the foregoing automatic adjustments of the slug severing saw will effect corresponding adjustments of the vise jaw and assembler stop. Hence, the length of the composed line will always correspond with the length of the slug to be produced. Fig. 14 shows a composed line, before and after justification, as used for the production of a long slug, while Fig. 15 shows a composed line, before and after justification, as used for the production of a short slug. The difference in length between the two lines is very slight, as intended, but is equal to the extent of the automatic adjustment of the slug serving saw, so that in either case the line of type characters cast from the matrices will extend out to but not beyond the end of the final slug produced. The extent of adjustment of the parts might be much greater, if desired, but it is preferred to keep it as small as possible so as to avoid making any considerable alteration in the length of the composed lines during the operation of the machine. In the present instance, the extent of adjustment is so small that it is hardly perceptible to the operator, who, therefore, is free to carry on the work of composition without having to give any attention to the matter of length of the composed lines. As a matter of fact, it is not essential that the assembler stop be automatically adjusted at all, as the justifying spacers would act in conjunction with the vise jaws to vary the length of the composed lines in the required manner. Such an effect is depicted in Figs. 14 and 15, in the former of which the spacers are shown as driven upwardly through the line to a greater extent than as shown in the latter figure.

Let it be assumed, for example, that it is desired to produce a printing form in which the type lines are 42 ems long, each line to be made up of two slugs placed end to end, with the lines of junction between the slugs breaking joint as shown in Fig. 19. The saw B is first adjusted manually to a point from which it is to be automatically adjusted to produce slugs of the different lengths required. In the present instance, the automatic mechanism has been designed to shift the saw for a distance equal to a 2 pt. adjustment, and hence in making the manual adjustment, the saw is set in position for a slug 21 ems and 1 pt. long. This will be the dimension of the longer slugs, and consequently the dimension of the shorter slugs will be 20 ems and 11 pts.

Means are also provided to locate the saw B accurately in its two automatically adjusted positions, reference being made particularly to Figs. 1, 11, 12 and 13. As shown, the block $B^9$ of the saw-carrier $B^2$ is provided with a stop pin F projecting into a horizontal slot $F'$ formed in an abutment plate $F^2$ sliding on the guide rails $A^{15}$ and adapted to be clamped thereto by means of a thumb screw $F^3$. When the abutment plate is clamped to the guide rails, the saw-carrier in its automatic adjustments moves relatively to the plate, and the upper and lower walls of the slot $F'$ act as fixed abutments to engage the stop pin F and limit the movement of the saw-carrier in opposite directions. On the other hand, when unclamped from the guide rails, the abutment plate is suspended from the stop pin and is free to be moved up and down with the saw-carrier in its manual adjustments. The thumb screw $F^3$ extends loosely through the abutment plate $F^2$ and an elongated opening in the block $B^9$ and is threaded into a nut $F^4$ slidable on the guide rails $A^{15}$ at the rear, the screw being formed with a shoulder $F^5$ adapted to engage the block $B^9$. A gravitating latch $F^6$ is pivoted to the abutment plate $F^2$ in position to lie against the stem of the thumb screw and in the path of its head portion. Consequently, when the thumb screw is tightened up, as shown in Fig. 12, the nut $F^4$ and abutment plate $F^2$ are clamped tightly against the guide rails $A^{15}$ and hold the abutment plate rigidly in position, it being noted in this condition of the parts that the block $B^9$ is unclamped from the guide rails and permits the saw-carrier to be adjusted upwardly and downwardly to the required extent. In the manual adjustment of the saw-carrier $B^2$, however, the latch $F^6$ is thrown out of the way, as shown in Fig. 11, to enable the thumb screw by engagement of its shoulder $F^5$ with the block $B^9$, to clamp the latter and the nut $F^4$ tightly against the guide rails in order to hold the saw-carrier rigidly in position. When the abutment plate $F^2$ is clamped to the guide rails, as in Fig. 12, to provide for the automatic adjustment of the slug carrier, the upper wall of the slot $F'$ abuts against the stop pin F, and consequently when the saw-carrier is later adjusted downwardly by the turning of the feed screw C, its movement is arrested (after a 2 pt. travel) by the engagement of the stop pin with the lower wall of the slot. Subsequently, of course, when the feed screw is turned in the opposite direction, the saw-carrier is moved up 2 pts. until the stop pin is arrested by the upper wall of the abutment plate slot. The saw is therefore caused to produce long or short slugs according as it is located in one or the other of its two different automatically set positions.

The provision of the abutment plate $F^2$ in connection with the stop pin F enables the slight saw-adjusting movements to be accurately effected and controlled without depending on accurate and minute movements of the actuating mechanism. In this connection, it is pointed out that the actuating member $D^{16}$ is formed to yield so as to admit of an overthrow movement of the parts after the feed screw C has been turned far enough to effect the full movement of the saw. Thus, as shown in several of the figures, the actuating member is formed in two sections, a tubular section $D^{16a}$ carrying the pusher head $D^{15}$ and a rod-like section $D^{16b}$ sliding in the tubular section and pivoted to the lever $D^{17}$, a helical spring $D^{16c}$ encircling the rod and bearing at its ends against the end of the tubular section, and a collar $D^{16d}$ on the rod. The spring $D^{16c}$ is strong enough to hold the pusher head to its work in turning the feed screw, but will yield in the event of obstruction being offered to the movement of the saw, such as when the stop pin F encounters the walls of the slot F' in the abutment plate.

As repeatedly stated, the automatic mechanism for adjusting the saw is designed to change the position of the saw at every other casting operation, so as to produce the slugs in alternate pairs, first two of one length, and then two of the other length. In starting out, however, as will be noted in Figs. 18 and 19, the first slug of the series (herein a long one) is followed by a slug of a different length (herein a short one). Consequently, the automatic mechanism should be initially set so that it will effect a change in position of the saw after a single (or the first) casting operation. This may be done simply by turning the rotary cam $E^3$ by hand to cause it to shift the slide E after one casting operation instead of two. The cam shaft $E^7$ (see Fig. 9) is provided with a knurled knob $E^{13}$ to facilitate such manual adjustment of the cam. To guide the operator in making the adjustment, the cam shaft is also provided with a dial plate H marked with the letters "L" and "S" arranged in alternate pairs around the dial and standing for long and short slugs, respectively. These letters are adapted, in the rotation of the dial plate, to be read in connection with a fixed index plate $H^1$ bearing the two captions "Next slug" and "Slug after next".

Figure 4:
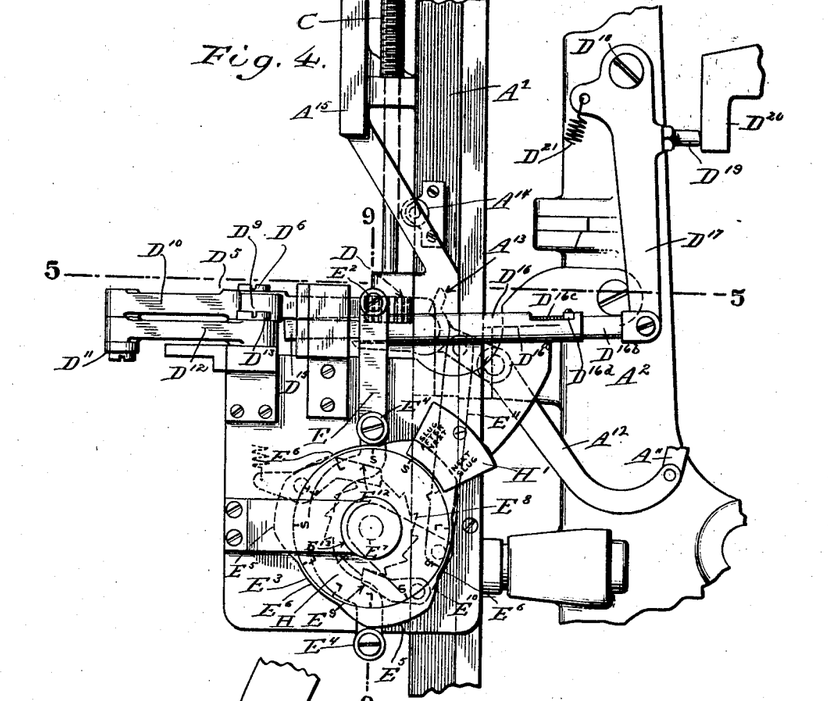
Fig. 4 is a side elevation, on an enlarged scale, of the automatic controlling mechanism for the adjustable saw.
Figure 5:
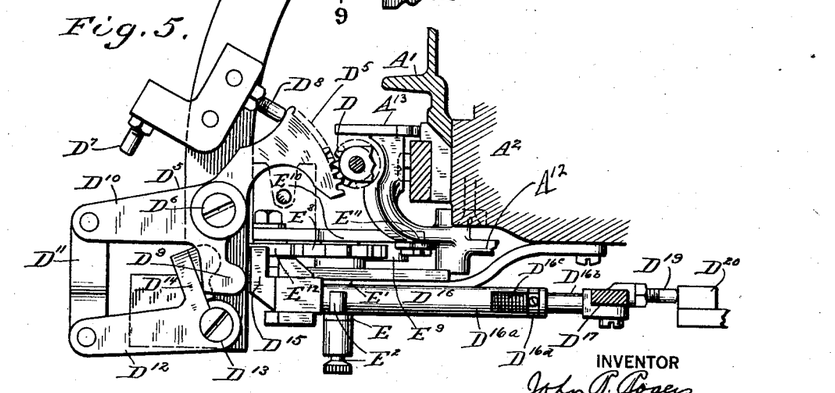
Fig. 5 is a horizontal sectional plan view taken on the line 5—5 of Fig. 4.

The letters "L" and "S" are spaced apart on the dial at intervals corresponding to the movement given the cam by the successive actions of the knife wiper, and the two captions on the index plate are spaced apart a like distance, so that in the intervals of rest, two adjacent letters on the dial plate will stand opposite the two captions on the index plate. In Fig. 4, for instance, (which represents the initial setting of the parts), a letter "L" stands opposite the caption "Next slug", and a letter "S" opposite the caption "Slug after next". This indicates that the parts are in such condition that, for the casting operation about to occur, the saw will be located in position to produce a long slug, and that for the casting operation next following, the saw will be in position to produce a short slug. In Fig. 6, (which represents an intermediate stage in the operation of the machine, a short slug having just previously been produced), a letter "S" stands opposite the caption "Next slug" and a letter "L" opposite the caption "Slug after next". This indicates that, for the casting operation about to occur, the saw will be in position to produce another short slug, and that for the casting operation next to follow, the saw will be in position to produce a long slug, this in turn to be followed by the production of the second long slug of the pair. It is pointed out that the manual adjustment of the cam $E^3$ by means of the knurled knob $E^{13}$ may also be resorted to in correcting errors, as for instance when it becomes necessary to cast a slug in place of one containing an error or imperfection. In such event, the operator has merely to turn the cam back the distance of one ratchet tooth and thereafter proceed in the regular way.

The operation of the machine will have been understood from the preceding description, but to make it entirely clear, a brief résumé will be given of the operations which take place in the production of the slugs in the order required to make up the printing form shown in Fig. 19.

Figure 16:
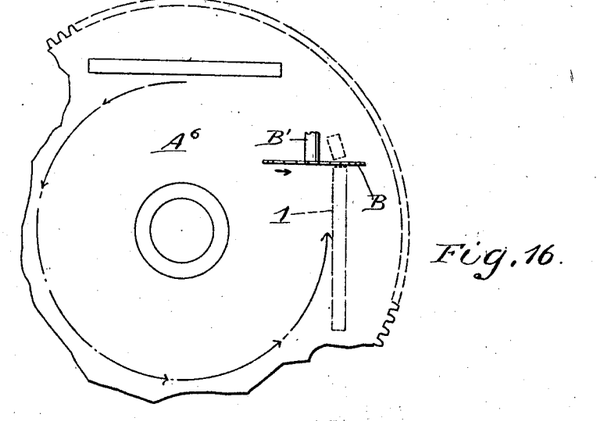
Figs. 16 and 17 are diagrammatic views of the mold wheel and slug severing saw showing the different lengths of the blank portions severed from the slugs in producing the long and short slugs, respectively.
Figure 17:
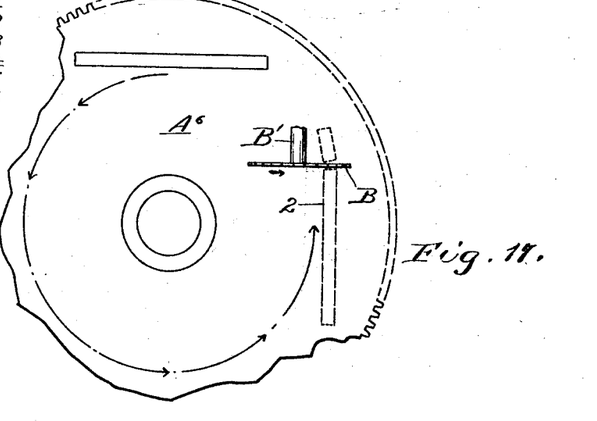

By operating the handle $C^6$, the saw B is set in the proper position according to the length of the slugs to be produced to make up the composite type lines desired, and by this same operation of the handle, the assembler stop and vise jaw are adjusted to correspond. To permit this manual setting of the saw, the clutch $D^3$ must be disengaged from pinion D on the feed screw C to enable the latter to be rotated by the handle, and the thumb screw $F^3$ must also be loosened up to free the saw-carrier $B^2$ and the abutment plate $F^2$ for adjustment. When the saw has been manually set in the desired position, the clutch collar $D^3$ is placed in engagement with the pinion D and the abutment plate $F^2$ is clamped to the guide rails $A^{15}$, the block $B^9$ being left loose to permit automatic adjustment of the saw-carrier. In this position of the parts, the stop pin F on the block $B^9$ is in engagement with the upper wall of the slot F' of the abutment plate and the saw is located in its higher position for the production of a long slug. If need be, the cam $E^3$ is then set by hand in the position shown in Fig. 4, where, as before mentioned, a letter "L" on the dial plate H stands opposite the caption "Next slug" and a letter "S" opposite the caption "Slug after next." As thus set, the cam will hold the actuating member $D^{16}$ in its lower position and in line with the arm $D^{14}$ of the elbow lever $D^{12}$. Upon the descent of the first elevator A' to present the composed line in casting position, the knife wiper operating lever $A^{12}$ will turn the cam $E^3$ one step forward, but without changing the position of the actuating member $D^{16}$. As the mold slide $A^7$ advances to press the mold $A^5$ against the composed line, the actuating member $D^{16}$ is pushed forwardly to swing the segment gear $D^5$ to the position shown in Fig. 5, unless the gear already occupies that position, in which event the actuating member simply makes an idle stroke. After the slug is cast, the mold disk $A^6$ makes a three-quarter turn and brings the mold to ejecting position, where the cast slug is ejected from the mold and carried past the saw B, which (occupying its higher position, as in Fig. 16) will produce the long slug 1 first in order. When, now, the next composed line is lowered to casting position by the descent of the first elevator, the cam $E^3$ is advanced another step and moves the slide E upwardly (see Fig. 1) to position the actuating member $D^{16}$ opposite the arm $D^9$ of the segment gear $D^5$, and as the mold slide moves forwardly to press the mold against the line, the actuating member will swing the segment gear to the position shown in Fig. 7, which action turns the feed screw C and adjusts the saw to its lower position, as determined by the engagement of the stop pin F with the lower wall of the slot F' in the abutment plate $F^2$. Being in its lower position, as in Fig. 17, the saw will be effective to produce the short slug 2 next in order. When the next composed line is presented by the descent of the first elevator, the cam $E^3$ is turned a further step, but this time without changing the position of the slide E, so that as the mold slide advances, the actuating member $D^{16}$ will make an idle movement and fail to operate the segment gear $D^5$. Consequently, the saw will remain in its lower position, and produce the second short slug 3 next in order. Thus far, a long slug has been produced followed by the production of two short slugs. When another composed line (the fourth) is lowered by the descent of the first elevator, the cam $E^3$ is advanced one step more and lowers the slide F to position the actuating member $D^{16}$ again opposite the arm $D^{14}$. Then, upon the advance of the mold slide to press the mold against the composed line, the actuating member is caused to engage the arm $D^{14}$ and swing the segment gear $D^5$ back to the position shown in Fig. 5, with the result that the feed screw C is rotated to adjust the saw upwardly to its original higher position for the production of the long slug 4 next in order. On the next descent of the first elevator, the cam $E^3$ is advanced without changing the position of the actuating member $D^{16}$, which, therefore, in the advance of the mold slide, makes an idle stroke and leaves the saw in its higher position for the production of the long slug 5 next in order. The continued operations of the machine will result in the production of alternate pairs of slugs of different lengths, as in the case of the two pairs just described, so that when the slugs are assembled in the order of their production in the manner indicated in Fig. 19, a printing form will be produced made up of composite type lines each composed of a long and a short slug, and in which the lines of junction break joint with each other.

While the invention is herein shown as applied to a linotype machine which casts the slugs and by ejecting action presents them successively to the saw, it will be understood that, in a broader aspect, it may be regarded as a slug-cutting apparatus in which the saw is automatically adjusted to produce slugs of different lengths in a certain definite order, without regard to how the slugs are in the first instance formed or presented to the saw. It will also be understood that, while in the example illustrated, each type line is made up of two slugs disposed end to end, the invention is applicable as well to the production of composite type lines made up of more than two slugs. It will be further understood that, while the preferred embodiment illustrated presents various constructional details, these details may be changed and modified in many ways without departing from the spirit of the invention. It should be understood, therefore, that the invention is not limited to any particular construction or arrangement of the parts except in so far as such limitations are specified in the claims.

Having thus described my invention, what I claim is:—

1. In a typographical machine, the combination of slug producing mechanism adjustable to vary the length of the slugs, and automatic means for effecting such adjustment at every other slug producing operation.

2. In a typographical machine, the combination of slug producing mechanism adjustable to vary the length of the slugs, and automatic means for adjusting said mechanism to cause the production of alternate pairs of slugs varying in length as between the pairs.

3. In a typographical machine, the combination of a slug producing mechanism operative to produce a slug at each cycle of operation of the machine and adjustable to vary the length of the slugs, and automatic means for adjusting said mechanism at certain definite cycles of operation of the machine to cause the production of alternate pairs of slugs varying in length as between the pairs.

4. A combination as specified in claim 1, characterized by the fact that the automatic means therein recited are adjustable to cause the production of a single slug before causing the production of slugs in alternate pairs.

5. In a typographical machine, the combination of slug forming means, adjustable slug severing means, and automatic means for adjusting the slug severing means at certain definite cycles of operation of the machine.

6. In a typographical machine, the combination of slug forming means, adjustable slug severing means, and automatic means for adjusting the slug severing means at every other severing operation.

7. In a typographical machine, the combination of slug forming means, adjustable slug severing means, and automatic means for adjusting the slug severing means to cause the production of alternate pairs of slugs varying in length as between the pairs.

8. In a typographical machine, the combination of means for forming slugs of a given length with type lines of different lengths, slug severing means adjustable to sever the blank portions beyond the type lines, and automatic means for altering the adjustment of the slug severing means in accordance with the length of the individual type lines.

9. In a typographical machine, the combination of means for forming slugs of a given length with type lines of different lengths, slug severing means adjustable to sever the blank portions beyond the type lines, and automatic means for altering the adjustment of the slug severing means at every other forming operation.

10. A combination as specified in claim 5, characterized by the fact that the automatic means therein recited are adjustable to cause the production of a single slug of a given length before causing the production of slugs in alternate pairs.

11. In a typographical machine, the combination of slug forming means, slug severing means adjustable to produce slugs of different lengths, means actuated by a periodically operated part of the machine for effecting such adjustment, and means actuated by another periodically operated part of the machine for controlling the adjustment.

12. In a typographical machine, the combination of slug casting means, a slug cutter adjustable to different operative positions to produce slugs of different lengths, and automatic means for altering the position of the cutter at every other casting operation.

13. In a typographical machine, the combination of slug casting means, an adjustable slug cutter, and means actuated during the normal operation of the machine for changing the operative position of the cutter at certain definite cycles of operation.

14. In a typographical machine, the combination of slug casting means, an adjustable slug cutter, and means actuated by a periodically operated part of the machine for adjusting the cutter.

15. In a typographical machine, the combination of slug casting means, an adjustable slug cutter, means actuated by a periodically operated part of the machine for adjusting the cutter, and means actuated by another periodically operated part of the machine for controlling the cutter adjustment.

16. In a typographical machine, the combination with the slug casting mold, the movable slide carrying the mold, and the movable knife wiper, of a slug cutter adjustable to produce slugs of different lengths, means actuated by the movement of the mold slide for effecting such adjustment, and means actuated by the operation of the knife wiper for controlling the adjustment.

17. In a typographical machine, the combination of slug casting means, an adjustable slug cutter, an actuating member for adjusting the cutter, said actuating member being shiftable in position and adapted in one position to adjust the cutter in one direction and in another position to adjust it in the opposite direction, and means for controlling the position of the actuating member.

18. In a typographical machine, the combination of slug casting means, an adjustable slug cutter, an automatically operated actuating member for adjusting the cutter, said actuating member being shiftable in position and adapted in one position to adjust the cutter in one direction and in another position to adjust it in the opposite direction, and automatically controlled means for changing the position of the actuating member.

19. In a typographical machine, the combination of slug casting means, an adjustable slug cutter, a rotary screw shaft for adjusting the cutter, a pinion on the shaft, a segment gear meshing with the pinion, an arm operatively connected with the segment gear for moving it in one direction, a second arm operatively connected with the segment gear for moving it in the opposite direction, an actuating member shiftable to cooperate with one or the other of the arms, and means for controlling the position of the actuating member.

20. In a typographical machine, the combination of slug casting means, an adjustable slug cutter, a rotary screw shaft for adjusting the cutter, a pinion on the shaft, a swinging segment gear meshing with the pinion, an automatically operated actuating member shiftable in position and adapted in one position to swing the segment gear in one direction and in another position to swing it in the opposite direction, and automatically controlled means for changing the position of the actuating member.

21. In a typographical machine, the combination of slug casting means, an adjustable slug cutter, an automatically operated actuating member for adjusting the cutter, said actuating member being shiftable in position and adapted in one position to adjust the cutter in one direction and in another position to adjust it in the opposite direction, a rotary cam for changing the position of the actuating member to control its adjustment of the cutter, and automatically controlled means for advancing the cam step by step at each casting operation, said cam being formed to maintain the actuating member in its shifted position during two successive casting operations between the periods of change.

22. In a typographical machine, the combination of slug casting means, an adjustable slug cutter, means actuated by a periodically operated part of the machine for adjusting the cutter, said means including a yielding member through which the adjusting movement is transmitted to the cutter, and means for limiting the adjusting movements of the cutter.

23. In a typographical machine, the combination of slug casting means, an adjustable slug cutter, a rotary screw shaft for adjusting the cutter in opposite directions, a pinion on the shaft, a swinging segment gear meshing with the pinion, a member movable by a periodically operated part of the machine for actuating the segment gear, said actuating member being yieldable to permit overthrow movement of the periodically operated part, and means for limiting the adjusting movements of the cutter.

24. In a typographical machine, the combination of slug casting means, adjustable line clamping mechanism, adjustable slug severing means, automatic means for effecting the adjustment of the slug severing means, and means whereby the automatic adjustment of the slug severing means will effect a corresponding adjustment of the line clamping mechanism.

25. In a typographical machine, the combination of slug casting means, adjustable line assembling mechanism, adjustable slug severing means, automatic means for effecting the adjustment of the slug severing means, and means whereby the automatic adjustment of the severing means will effect a corresponding adjustment of the line assembling mechanism.

26. In a typographical machine, the combination with the adjustable assembler stop, the adjustable vise jaw, and the slug casting mold, of an adjustable slug cutter, automatic means for effecting the adjustment of the slug cutter, and means whereby the automatic adjustment of the cutter will effect a corresponding adjustment of the vise jaw and assembler stop.

27. In a typographical machine, the combination of assembling mechanism having an adjustable assembler stop to control the length of the composed matrix line, and means controlled by a periodically operated part of the machine for automatically adjusting said assembler stop.

28. In a typographical machine, the combination of assembling mechanism having an adjustable assembler stop to control the length of the composed matrix line, an adjustable vise jaw to confine the matrix line, and means controlled by a periodically operated part of the machine for automatically adjusting said assembler stop and vise jaw.

29. In a typographical machine, the combination of an adjustable vise jaw to confine the matrix line, and automatic means for effecting the adjustment of the vise jaw at every other cycle of operation of the machine.

30. In a typographical machine, the combination of assembling mechanism having an adjustable assembler stop to control the length of the composed matrix line, an adjustable vise jaw to confine the matrix line, and automatic means for effecting the simultaneous adjustment of the assembler stop and vise jaw at every other cycle of operation of the machine.

31. In a typographical machine, the combination of slug casting means, a slug cutter, a carrier for the cutter, manually controlled means for adjusting the carrier to set the cutter at a selected point, automatically controlled means for adjusting the carrier from its manually set position to cause the cutter to produce slugs of different lengths, abutments for limiting the automatic adjusting movements of the carrier, said abutments being movable with the carrier in its manual adjustments, and a locking device for holding the abutments fixedly in relation to the carrier.

32. In a typographical machine, the combination of slug casting means, a slug cutter, a carrier for the cutter, manually controlled means for adjusting the carrier to set the cutter at a selected point, automatically controlled means for adjusting the carrier from its manually set position to cause the cutter to produce slugs of different lengths, a plate movable with the carrier in its manual adjustments and provided with abutments, a stop lug on the carrier engaging between said abutments, and means for locking said plate fixedly in position relative to the carrier during the automatic adjustments of the latter.

33. In a typographical machine, the combination of slug forming means, slug severing means adjustable to produce slugs of different lengths, automatic means for effecting such adjustment, and means for rendering said automatic means inactive when desired.

34. In a typographical machine, the combination of slug casting means, an adjustable slug cutter, manually controlled means for setting the cutter in different selected positions, and automatic means for adjusting the cutter from its manually set position.

35. In a typographical machine, the combination of slug casting means, slug severing means adjustable to produce slugs of different lengths, manually controlled means for effecting the adjustment of said severing means, and automatically controlled means for varying the manual adjustment of the severing means.

36. In a typographical machine, the combination of slug casting means, an adjustable slug cutter, automatic means for altering the position of the slug cutter at every other casting operation, said means being adjustable manually to change the position of the cutter after a single casting operation, and an indicator to guide the operator in making such manual adjustment of the automatic means.

37. In a slug severing apparatus, the combination of a cutter, means for presenting slugs successively thereto, and automatic means for varying the position of the cutter at every other cutting operation.

38. In a slug severing apparatus, the combination of adjustable severing means, means for presenting slugs thereto, and automatic means for altering the adjustment of the severing means to produce slugs of different lengths.

39. In a slug severing apparatus, the combination of a cutter, means for presenting slugs successively thereto, manual means for setting the cutter in different selected positions, and automatic means for varying the manually set position of the cutter at certain cutting operations.

40. In a slug severing apparatus, the combination of a cutter, means for presenting slugs thereto, and automatic means for varying the position of the cutter so as to produce alternate pairs of slugs varying in length as between the pairs.

In testimony whereof, I have affixed my signature hereto.

JOHN R. ROGERS.